July 15, 1969 W. F. HURD 3,456,122

SWITCHING APPARATUS

Filed June 14, 1967 3 Sheets-Sheet 1

INVENTOR
WILLIS F. HURD

BY Frank A. Seeman

ATTORNEY

SWITCHING APPARATUS

Filed June 14, 1967

United States Patent Office
3,456,122
Patented July 15, 1969

3,456,122
SWITCHING APPARATUS
Willis F. Hurd, Marietta, Ohio, assignor to Sperry Rand Corporation, New York, N.Y., a corporation of Delaware
Filed June 14, 1967, Ser. No. 646,108
Int. Cl. H02j 1/10
U.S. Cl. 307—29 8 Claims

ABSTRACT OF THE DISCLOSURE

Apparatus for selectively interconnecting any one of a plurality of input terminal groups to any one of a plurality of output terminal groups. Separate stepping switches are associated with each of the input and output terminal groups to provide control and coupling means for multi-level signals adapted to flow between selected groups. A unique interconnecting arrangement interrelated with the switches and terminals enables automatic path selection characterized by the inherent functioning and harmonious operation of the stepping switches.

Background of the invention

The present invention relates to switching apparatus of the nature described above and more particularly to new and useful improvements in apparatus for selectively coupling one or more related signals to predetermined output units.

For many years television has been an accepted means of communications and has been used extensively throughout home and business facilities. In recent years television has been adapted for more diverse industrial and military applications, particularly in facilities involving a limited viewing audience, such as groups of students in a classroom at an educational institution or at a commercial or military training facility.

Such discriminate viewing use for television is most widely exploited in instructional type installation of the type mentioned in the above paragraph. Another application in which television is readily adaptable for a particular limited use, and is presently being successfully exploited, is the information handling area. Regardless of the specific use, viewing operations of the discriminating type in many instances employ closed circuit systems. There are countless fields in the business world where information handling serves many diversified needs. A few examples include banking, insurance, manufacturing and governement facilities as well as hospitals, engineering and wholesale firms, public utilities, etc. In all of these fields closed circuit television is capable of improving customer service and assuring fast and accurate transactions, by providing unfailing delivery of records, i.e., televised reproduction of remotely stored records, documents, or the like.

Closed circuit television systems in any but the simplest one-camera systems, necessarily require switching equipment to select the output from one of several signal sources and connect it to one particular outgoing path.

For instance, in a studio system, the switching equipment provides for program monitoring and previewing as well as providing switching between cameras in the studio, film cameras, remotely disposed pickup cameras, and to provode special effects such as fading. Another exemplary use is in a surveilance system wherein several cameras and several monitor stations are continuously utilized, thereby requiring the facility of camera selection by any one of the several monitoring stations. Still another use is in a system employed for information handling wherein several camera stations are disposed at information media storage locations for transmitting document images. Completing the system are several remote monitor stations which include one or more operators who may periodically view a document stored at any one of the several storage locations.

Summary of the invention

The present invention contemplates switching equipment of the nature mentioned above and more particularly to apparatus for selectively switching one of several multi-level input signals to any one of several output units. This switching is achieved by utilizing input and output stepping switches adapted to simultaneously home to selected positions on their corresponding contact banks. The contacts on each input switch are each associated with a particular output unit while the output switch contacts are each associated with an input switch, which in turn is associated with one of the several multi-level input signals. Accordingly, an automatic one-to-one switching matrix is provided.

The selection function of the matrix is carried out by means adapted to selectively energize the applicable stepping switch electromagnets through circuitry including elements connected in a manner whereby de-energization takes place upon arrival of both input and output stepping switch wipers at the contact positions corresponding to the selected input/output combination. This operational condition is maintained until the original selection means are returned or released to the initial non-operative condition. During operation the switching apparatus will reject commands requesting that other multi-level signals be provided at the output in use. Likewise, a command will be rejected when a signal in use is requested at an output not in use. Subsequent to initiation of the above mentioned release function the apparatus automatically returns to normal conditions to await further input commands. In the event a command is simultaneously present when release takes place, automatic return is obviated and the next selected operational condition is effected.

Accordingly, it is an object of the present invention to provide efficient switching apparatus which enables one or more circuits to be selectively on a one-to-one basis connected to or disconnected from one or more output units with full diversity of connection capability and negligible interference between such connections.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood however, that the drawings are for illustrative purposes only and are not to be construed as defining the limits of the invention.

Description of the preferred embodiment

Figure 1:
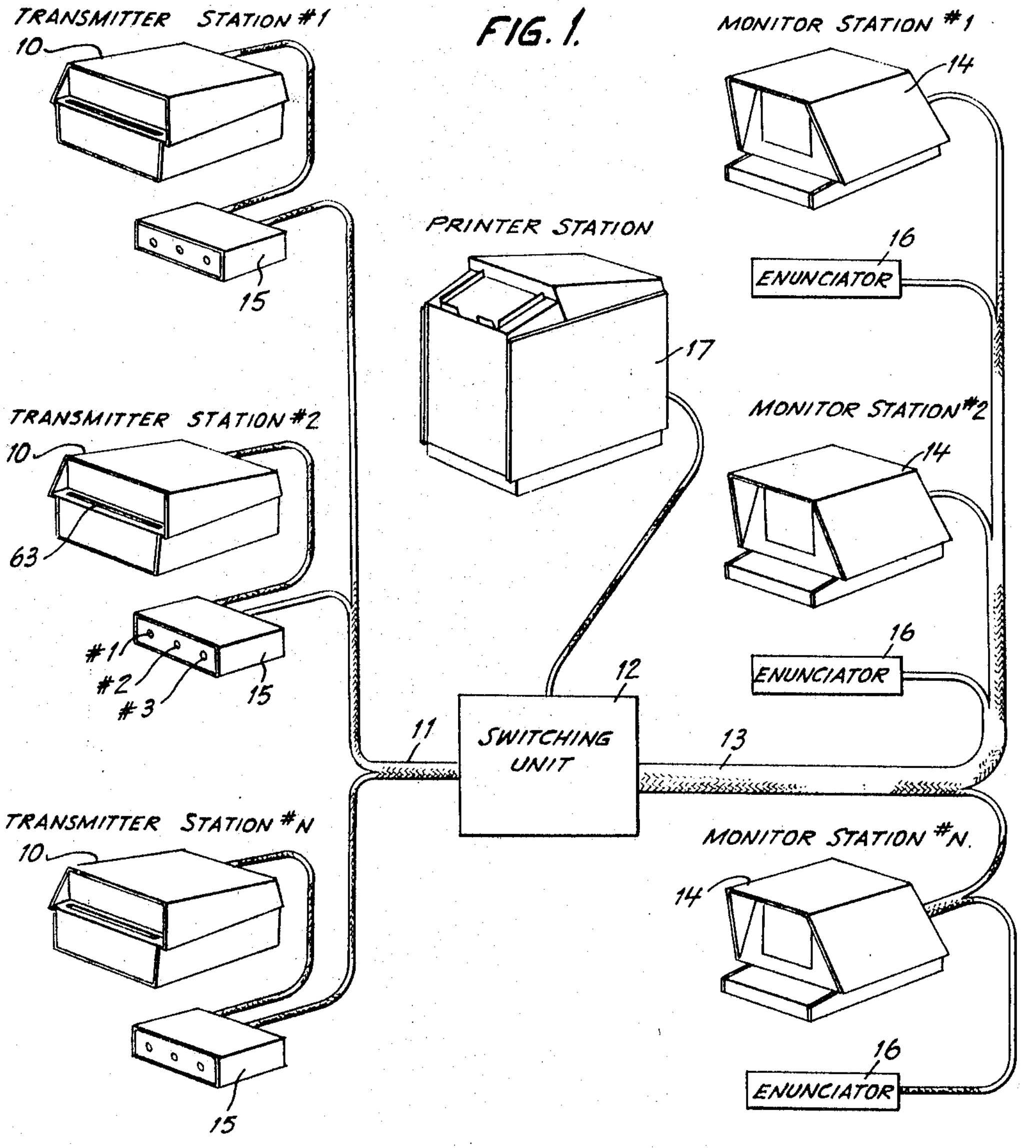
FIG. 1 is a diagrammatic perspective view of an information handling system in which the switching apparatus of the present invention may be readily employed.

Now referring to the drawing for a more detailed description, an information handling system is depicted in FIG. 1 to illustrate by way of example, the type of equipment in which one embodiment of the present invention may be readily employed. The system shown more specifically involves the utilization of closed circuit television equipment to accomplish local viewing of selected documents remotely stored. Three similar transmitters, designated by reference numeral 10 are interconnected via a first cable array 11, a switching unit 12 and a second cable array 13 to three similar monitors, designated by reference numeral 14. Three transmitter and three monitor stations are shown for convenience; however, it should be understood that a system of the nature involved is not such that a like number of transmitters and monitors need be employed, nor is there any limitation as to the total number of units. In this regard, the last transmitter and monitor stations are identified by N to further show that the number of units has no definite limit.

In the system shown in FIG. 1, a selection unit 15 is associated with each transmitter station, for providing manual input commands to initiate appropriate coupling between the associated transmitter and any one of the monitor stations. Further, each monitor station is associated with an enunciating device 16 for communicating with the various transmitter stations. Switching unit 12 is centrally disposed and provides apparatus whereby output signals from any one of the several transmitters can be connected to the input of any one of the several monitors. Completing the illustrative system is a printer station at which one or more copying devices 17 may be employed to selectively provide copies of document images in response to appropriate operator command.

With regard to switching unit 12, the diagrammatic block is centrally disposed illustrating that switching apparatus is at the hub of the system shown. In view of the video signals, involved, broadband information must be accommodated as well as various control signals, such as enunciator and printer commands. The basic function of this switching unit resides in its operation as a one-to-one matrix for multi-level signals. As described below, no amplifiers or impedance transformation devices are required and the switching unit accommodates any selected input-output combination without need for internal handling circuits. This function is carried out with full diversity of connection capability to simultaneously accommodate an unlimited capacity of one-to-one connections. It will become obvious from the following description that, even though switching unit 12 is described in a particular environment, i.e., a closed circuit television information retrieval system, it is not limited to such environment. There are many obvious other needs for multi-level switching in which several plural-signal input stations are selectively interconnected to one or more output units.

Figure 2:
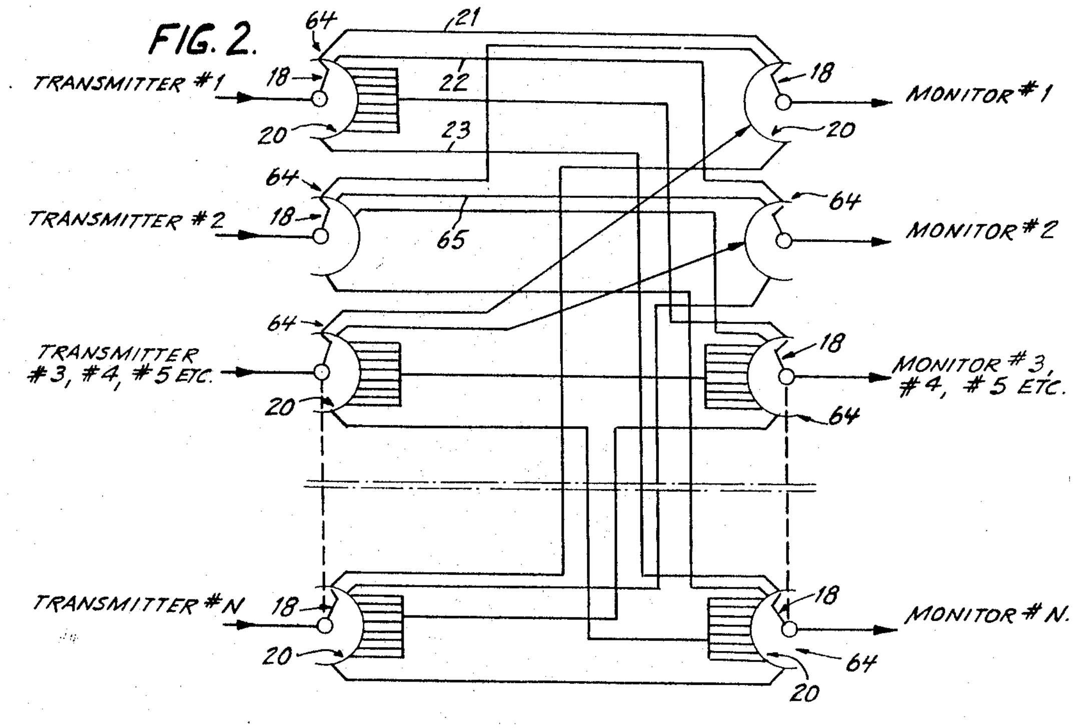
FIG. 2 is a partial schematic diagram illustrating the signal paths through one level of the switching apparatus illustrated in FIG. 1.

The present invention incorporates several of the basic elements of a stepping switch which is commonly employed for selecting, interrupting or changing the connections in a succession of electric circuits in response to momentary impulses of current. Generally, a stepping switch includes a bank of electrical contacts arranged in a semi-cylindrical manner and comprising a plurality of side-by-side semi-circular levels having a like number of corresponding positions. Each has a rotatable wiper associated therewith, and the wipers rotate in concert about an axis coextensive with the axis of the contact bank. Thus, a circuit may be provided through the switch via the wiper arm and the contact associated with the angle of wiper arm rotation with respect to the contact bank. Referring again to FIG. 1, each transmitter 10 provides a video signal and associated control signals, which arrangement necessitates a plurality of simultaneous signal paths. In FIG. 2, a switching matrix is depicted in which the path for only one level of each of the multi-level signals is illustrated. In the subject system a separate stepping switch is associated with each transmitter, and likewise a separate stepping switch is associated with each monitor. Each switch includes several levels of the nature shown in FIG. 2. Further, if a plurality of printing stations are desired then a separate stepping switch for each copier is necessary. In the embodiment described in detail hereinafter, the system outputs are represented as monitors only; however, either a printer or monitor could be adapted to receive the multi-level signals in a similar manner insofar as the present invention is concerned.

More specifically, the level illustrated in FIG. 2 includes a wiper 18 associated with one level of the mentioned stepping switches for each of the transmitter and monitor stations. The wipers shown conduct one level of the signals involved through the associated level of stationary contacts, pictorially represented by semi-circular segments 20. Each of the other levels of signals are provided with a similar wiper connection which is associated with a similar contact level, physically disposed in parallel side-by-side relationship with the illustrated semi-circular segment of the bank. In the level illustrated, each transmitter wiper successively contacts stationary contacts connected to each of the monitor stepping switches. Thus, there is a separate connection from an individual fixed contact on each stepping switch associated with a transmitter to one fixed contact on every stepping switch associated with a montor. For example, conductor 21 is adapted to interconnect transmitter #1 to monitor #1, conductor 22 (next in sequence) is adapted to interconnect transmitter #1 to monitor #2, . . . and conductor 23 is adapted to interconnect transmitter#1 to monitor #N. Accordingly, any transmitter can be connected to any one monitor by proper rotation of the associated wiper arms. It should be noted that the arrangement precludes the connection of two transmitters to the same monitor (or vise versa) by virtue of the one-to-one ratio inherent in the matrix.

Figure 3:
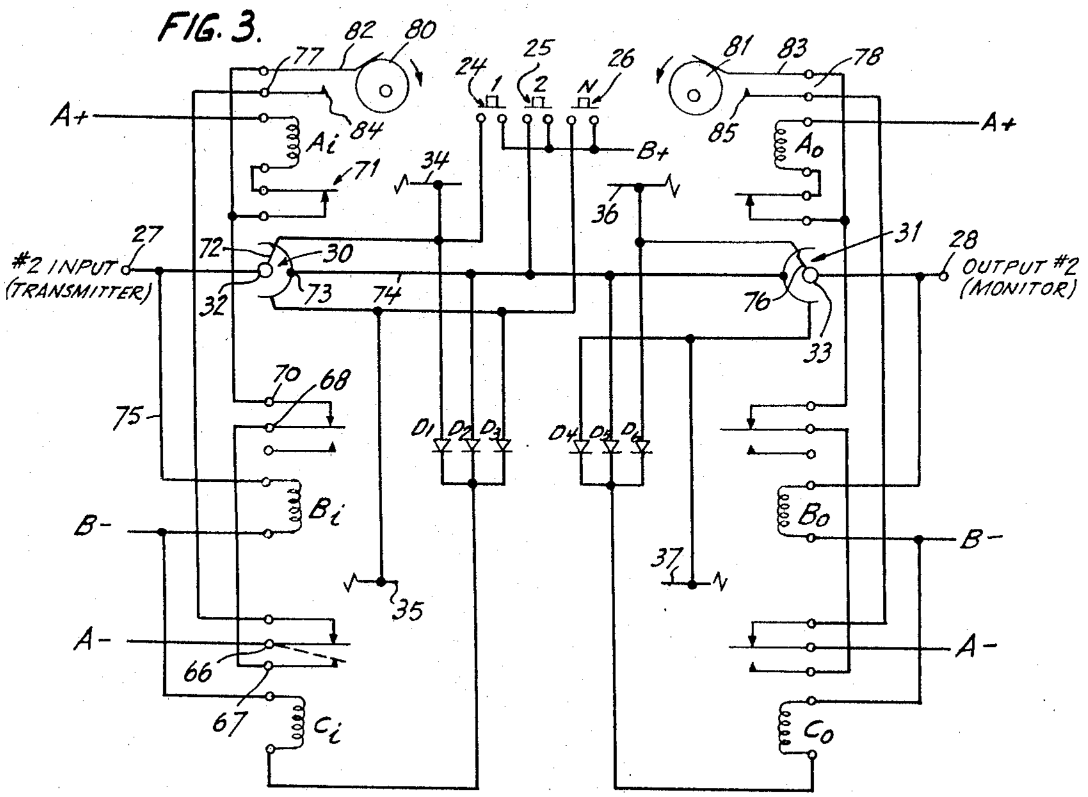
FIG. 3 is a schematic diagram showing the selection circuitry as it relates to one level of an input unit and one of the associated levels of one of the several output units capable of being coupled thereto.

The switching apparatus of the present invention includes unique selection circuitry wherein selection of a particular transmitter/monitor combination is effected in response to an enunciated request. In a broader sense the switching array provides a one-to-one connection of any selected input/output combination. An illustrative portion of the switching circuitry is depicted in FIG. 3, wherein one input circuit and one output circuit are shown, each typical of any input or output and respectively associated with a particular stepping switch. Select buttons 24, 25 and 26 correspond to the buttons on any one of the selection units 15 shown in FIG. 1. Selection of any output can be effected for the associated input, e.g., in this instance a transmitter input is connected to output #2. Input terminal 27 is connected to output terminal 28, via stepping switches 30 and 31. The selection circuitry of FIG. 3 only shows one level of switches 30 and 31; however, a plurality of similar levels and wipers are mounted in an adjacent manner as discussed above. Thus, when shafts 32 and 33 are rotated to a particular angle all the wipers are positioned accordingly.

Figure 4:
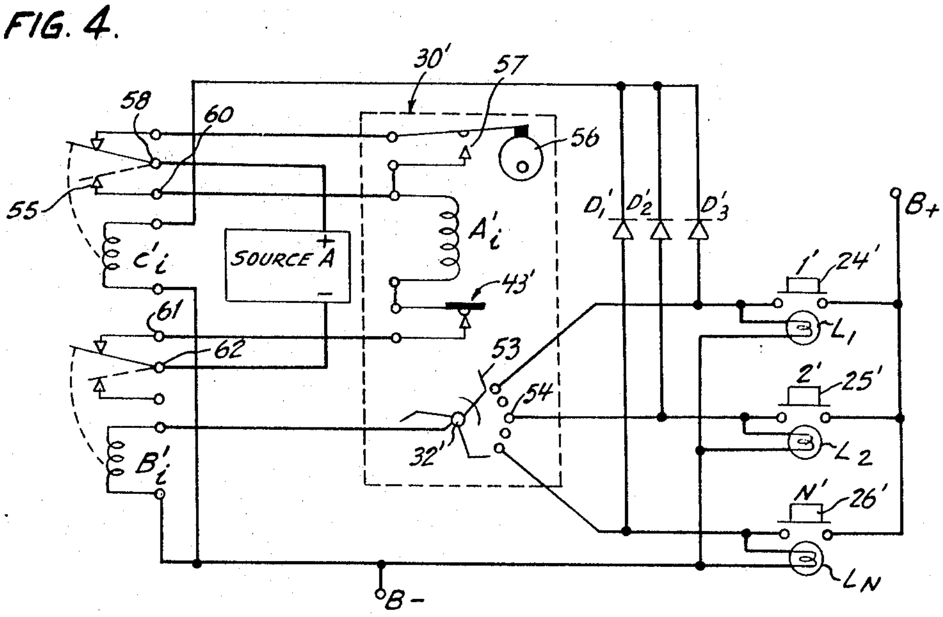
FIG. 4 is a schematic diagram showing in further detail a portion of the circuitry of FIG. 3.
Figure 5:
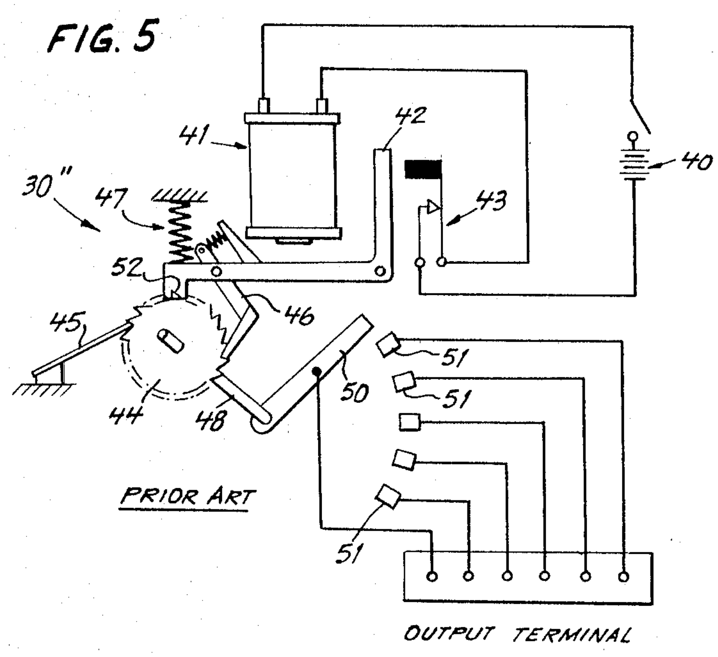
FIG. 5 is a schematic diagram of typical prior art stepping switch apparatus connected for self-interrupting operation.

Push button 25 is provided for selection of the output shown, while push buttons 24 and 26 are employed to select outputs (not shown) connected to conductors 34 and 35, respectively. Further it should be noted that other inputs may be coupled to output 2 via conductors 36 and 37. The remaining elements shown in FIG. 3 circuitry will be described as they relate to operation set forth hereinbelow. For convenience a portion of the selection circuitry is shown in FIG. 4 in a modified configuration to more specifically explain particular features and the unique operation thereof, as it relates to a stepping switch. FIG. 5 shows a known-to-the art stepping switch control arrangement capable of use with and forming an integral part of the present switching apparatus.

A principal feature of the present invention is embodied in the modified electrical arrangement of FIG. 4, which shows schematically a stepping switch as it relates to the FIG. 3 selection arrangement. For convenience, primed references numerals are associated with elements in FIG. 4 having similar counterparts in FIG. 3 with corresponding functions. An indirect drive rotary stepping switch is shown in FIG. 5 for exemplary purposes, it not being intended that the invention be limited only to the switch control operations shown. For example, a self-interrupted arrangement is shown; however, an impulse source could be used to provide an equivalent operation.

The stepping switch shown in FIG. 5 is generally designated by reference numeral 30″, and includes a drive source 40, connected across an electromagnet 41 associated with a pivotal armature member 42. Upon energizing of electromagnet 41 interrupter contacts 43 are separated in the drive source circuit causing de-energization of electromagnet 41, which in effect results in a momentary impulse of current. Switch 30″ also includes a ratchet wheel 44, a wheel detent 45, a spring biased pawl 46, a driving spring 47, a driven shaft 48, a wiper 50 and several fixed contacts 51. In an indirect-drive, spring-driven operation, wiper 50 successively engages contacts 51 in response to the mentioned current impulses. Increments of shaft rotation are effected when pawl 46 is moved away from the tooth of ratchet 44, with which it is registered, and into engagement with the next succeeding tooth. Stopping teeth 52 in armature 42 are also simultaneously disengaged. During disengagement, detent 45 prevents slippage. Immediately following disengagement the magnet becomes de-energized and the wiper assembly is driven from one contact to the next under power of driving spring 47 through the intermediary of pawl 46, ratchet 44 and shaft 48.

The selection circuit shown in FIG. 4 can best be described by a brief explanation of an operational sequence. A bank of selection buttons 24′, 21′ and 26′ are provided to enable an operator to initiate switching by depression of a button corresponding to a particular desired selection. For example, if rotation of shaft 32′ is desired whereby wiper arm 53 is positioned for engagement with fixed contact 54, button 25′ is depressed and relay coil $C_1'$ is energized via diode $D_2'$. Contact 55 is thus directly connected (broken line position) to Source A providing a control voltage for stepping switch winding $A_1'$, which winding comprises an element of stepping switch 30′, represented schematically within a broken line rectangular outline. Operation of the switch per se is exactly described previously herein in connection with the description relating to FIG. 5 and includes self-interruption of coil energization by means of interrupter contacts 43′.

Shaft 32′ is advanced incrementally from the position shown until arm 53 rests on contact 54 whereupon coil $B_1'$ is energized (broken line position) and Source A is disconnected from stepping switch 30′. At this time indicator lamp $L_2$ glows and the selected position is held as long as button 25′ remains in the depressed position, which may be detented either manually or automatically. Upon release of button 25 wiper shaft 32′ continues incremental rotation in a clockwise direction until cam 56 arrives at the home position shown. The cam 56 controls contacts 57 which are open in the position shown and closed in all other positions of the switch. The cam 56 is adapted to incrementally rotate in concert with wiper arm 53 and is normally adapted to make a complete cycle during one full excursion of the wiper arm past the contact bank. Thus, terminals 58 and 60 of relay $C_1'$ remain shorted via contacts 57 until cam 56 is rotated through a complete cycle which may be one revolution of shaft 32′ or a fraction thereof according to design requirements. In this instance one cycle is completed for 120° of rotation. Return of switch 30′ to the so called home position is brought about by virtue of release of relay $B_1'$ to its normally non-energized condition, permitting reconnection of Source A to switch 30′ via contacts 61 and 62.

In now turning to the overall operation of the present invention as illustrated in FIG. 3, the concept of operation of the selection circuit described above is directly applicable. Assuming for the purpose of simplicity that an operator at monitor station #2 (see FIG. 1) announces via enunciator 14 to transmitter station #2 that a particular file of documents are desired for viewing. The enunciator function can be via a telephonic media or any typical visual or audible substitute for conveying request data. At transmitter station #2 the operator has available stored documents or replicas thereof, such as microfilm for example, and a television camera adapted to pickup the document image and transmit same to remote locations through switching unit 12. The operator at transmitter station #2 upon receiving the mentioned request retrieves the requested document or replica and inserts it into a slot 63 in unit 10 followed by the appropriate selection of a command button in control unit 15. In this particular example, button #2 will be depressed to switch the signal paths from transmitter #2 to monitor #2 whereupon the requested document image is viewed on the monitor screen.

As discussed above the typical multi-level transmitter signal includes several control signals along with the video-signal for each selection made through the above mentioned steps of operation. In FIG. 2 the appropriate stepping switches 64 will be rotated to interconnect conductor 65 between the associated wipers 18. Also mounted on the shafts of switches 65 are several side-by-side wipers for simultaneously selecting similarly positioned contacts in parallel contact banks to provide a multi-level path through the matrix shown.

The selection referred to in the above example with reference to FIGS. 1 and 2, specifically involves the following sequence of steps in the selection circuit shown in FIG. 3. Selection button 25 is depressed (physically disposed at control unit 15) connecting B+ potential across coil $C_1$ which effects energization of coil $A_1$ via terminals 66 and 67 of relay $C_1$ (broken line position), terminals 68 and 70 of relay $B_1$ and interrupter contacts 71 of stepping switch $A_1$. When wiper 72 reaches the contact 73 connected to conductor 74, coil $B_1$ is energized via conductor 75 through the contacts at the selected position of the stepping switch level shown. Under these conditions coil $C_1$ remains energized and energization of coil $B_1$ effects interruption of energization of coil $A_1$ via the terminals of relay $B_1$. Meanwhile wiper 76 is simultaneously positioned in a similar manner and held accordingly when the connection is made between the selected input/output combination. Arrival in time sequence of wiper 76 at its selected angular position with respect to arrival of wiper 72 at its corresponding selected position depends on the relative angular rotation from the original respective home positions.

Upon release of buttons 25, coils $C_1$ and $C_0$ are de-energized and normal contact positions thereof are resumed, whereby stepping switch electromagnet coils $A_1$ and $A_0$ are energized via terminals 77 and 78, associated with cams 80 and 81. Successive stepping takes place until such time of the cams 80 and 81 are rotated to their home positions (shown in FIG. 3) and arms 82 and 83 are lifted from contacts 84 and 85. The switching system has thus completed one cycle of operation and is again in condition for awaiting future selection.

Many advantages of the present invention have been explicitly and implicitly set forth in the above description. Prevalent among these advantages is the capability of the system to increase switching capacity to accommodate varying numbers of grouped signals. Any number of input and output sets is conceivable. In cases where the required number of levels on available stepping switches would be exceeded, two or more stepping switches could be electrically slaved to the same set of selector buttons.

Further, in cases where the required number of positions available would be exceeded, two or more stepping switches could be connected together such that the fixed contacts in the normally off (home) position of the switch whose movable contacts are connected to an input or output terminal, are connected to the movable contacts of the switch employed to provide the added capacity. Thus, when a selection is made involving conductors on the fixed contacts of the "added" switch, the first stepping switch in the tandem connection remains in the off-normal (home) position, and connections are made to the movable contacts of the "added" switch through the fixed contacts in the home position of the first switch. The "added" switch then selects the desired position on its bank of fixed contacts. Additional switches may be added in a like manner to provide any practical number of input/output combinations.

Still further advantages reside in the flexibility of the switching apparatus as well as the diversity of function and operation.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims, as will now be understood by those skilled in the art.

I claim:

1. Switching apparatus comprising,
(a) a first stepping switch including an actuating electromagnet, a plurality of fixed contacts and a wiper arm disposed for sliding engagement with the fixed contacts,
(b) an input terminal connected to said wiper arm,
(c) a second stepping switch including an actuating electromagnet, a plurality of fixed contacts and a wiper arm disposed for sliding engagement with the fixed contacts,
(d) an output terminal connected to said second stepping switch wiper arm,
(e) means for interconnecting one of said contacts of said first switch with one of said contacts of said second switch,
(f) means for energizing said electromagnets, and
(g) means operative to interrupt said energizing means under conditions where said first wiper engages said one of said first switch contacts and said second wiper engages said one of said second switch contacts, whereby said input terminal is connected to said output terminal,
(h) said interrupting means including a relay coil connected to said input terminal and operatively associated with normally closed contacts in circuit with the winding of said first electromagnet,
(i) said coil adapted to be energized for opening said normally closed contacts under conditions where said one of said first switch contacts is engaged by said first wiper.

2. Switching apparatus as set forth in claim 1, wherein said interrupting means includes an output relay coil connected to said output terminal and operatively associated with normally closed contacts in circuit with the winding of said second electromagnet, and
said output coil is adapted to be energized for opening said normally closed contacts under conditions where said one of said second switch contacts is engaged by said second wiper,
whereby said first and second stepping switches operate in concert in response to said energizing means to provide a circuit between said input and output terminals.

3. Switching apparatus as set forth in claim 1, wherein said interconnecting means includes selection means comprising a direct current voltage source, a second relay coil connected in circuit with said first relay coil and operatively coupled to normally open contacts in circuit with the winding of said first electromagnet, and holding means for connecting said voltage source across said second relay coil for effecting energization of said first electromagnet.

4. Switching apparatus as set forth in claim 3, wherein said holding means is connected in series with said second relay coil and,
said series circuit is connected in parallel with a circuit through said one of said first switch contacts, said first wiper and said first relay coil under conditions where said normally closed contacts are in circuit with the winding of said first electromagnet,
said parallel circuit being interrupted under conditions where said contact is not in contact with said wiper.

5. Switching apparatus as set forth in claim 1, and further comprising
a predetermined plurality of stepping switches including said second stepping switch and each having an electromagnet, a plurality of fixed contacts and a wiper arm disposed for sliding engagement with the fixed contacts,
a like plurality of output terminals each of which is connected to one of said plurality of said stepping switch wiper arms,
each of said plurality of stepping switches including a contact connected to a fixed contact of said first stepping switch,
said interconnecting means adapted to selectively interconnect one of said plurality of output terminals to said input terminal.

6. Switching apparatus as set forth in claim 1, wherein said first stepping switch includes a home position for the wiper contact corresponding to a particular fixed contact,
said interconnecting means includes holding means for holding said electromagnets in the energized condition, and
delay means for effecting continual energization of said stepping switch upon release of said holding means until the switch wiper is driven to said home position.

7. Switching apparatus as set forth in claim 6, wherein said second stepping switch includes a home position corresponding to a particular fixed contact of the second switch,
means for effecting continued energization of said second stepping switch to independently drive said second switch to said home position upon release of said holding means.

8. Switching apparatus as set forth in claim 1, wherein said first stepping switch includes a plurality of side-by-side levels comprising a plurality of fixed contacts and a like plurality of wiper arms associated therewith, and said second stepping switch includes a plurality of side-by-side levels comprising a plurality of fixed contacts and a like plurality of wiper arms associated therewith, said interconnecting means adapted to connect one or more of the fixed contacts in the side-by-side levels of the first stepping switch to one or more of the side-by-side levels of fixed contacts in the second stepping switch.

References Cited

UNITED STATES PATENTS 3,378,742 4/1968 Telkamp ---------- 318—20.810

ROBERT K. SCHAEFER, Primary Examiner

H. J. HOHAUSER, Assistant Examiner

U.S. Cl. X.R.

318—33